July 12, 1932.  W. RIENKS  1,867,328
ALTERNATING CURRENT MOTOR
Filed July 13, 1927  3 Sheets-Sheet 1
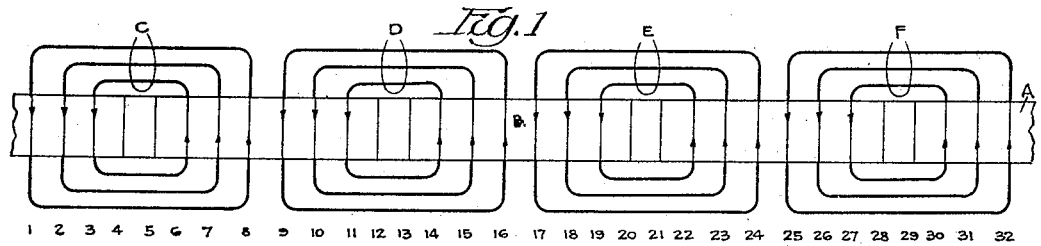
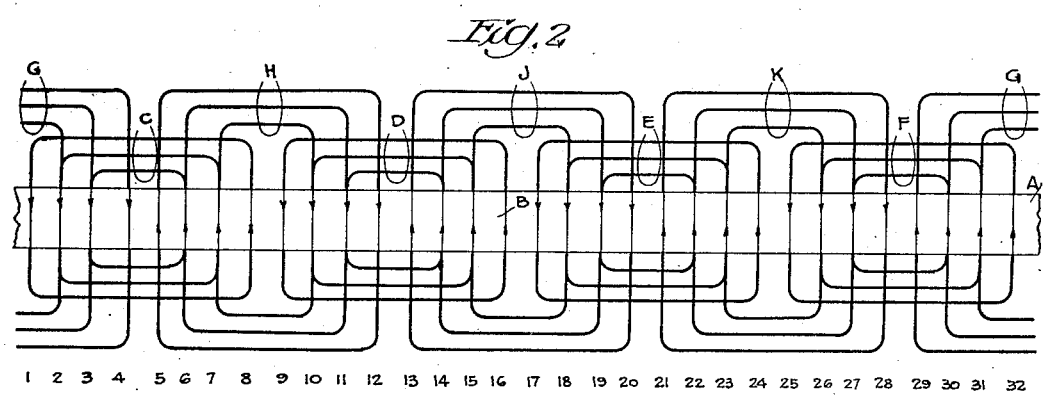
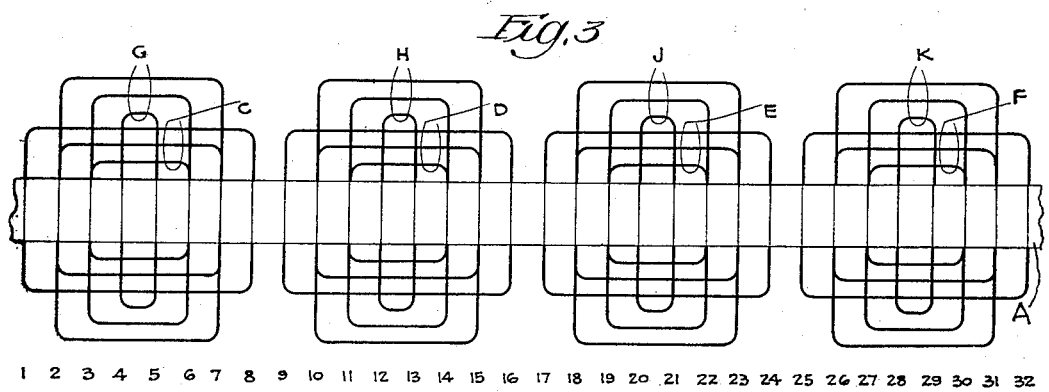
Inventor
William Rienks
By Nissen & Crane Attys July 12, 1932. W. RIENKS 1,867,328
ALTERNATING CURRENT MOTOR
Filed July 13, 1927 3 Sheets-Sheet 2

Inventor:
William Rienks
By Leever, Cox & Moore
attys

July 12, 1932.  W. RIENKS  1,867,328
ALTERNATING CURRENT MOTOR
Filed July 13, 1927   3 Sheets-Sheet 3

Inventor:
William Rienks,
By Leever, Cox & Moore
attys.

Patented July 12, 1932

1,867,328

UNITED STATES PATENT OFFICE

WILLIAM RIENKS, OF ROTTERDAM, NETHERLANDS, ASSIGNOR TO U. S. SLICING MACHINE COMPANY, OF LA PORTE, INDIANA, A CORPORATION OF INDIANA

ALTERNATING CURRENT MOTOR

Application filed July 13, 1927, Serial No. 205,374, and in the Netherlands July 30, 1926.

This invention relates to motor windings for stators of alternating current induction motors, and has for one of its objects the provision of stator windings which will permit change of the number of poles and consequently the speed of the motor without producing undesirable effects upon the operation of the motor.

Other objects will appear from the following description.

The invention is diagrammatically illustrated by way of example in the accompanying drawings and described in the following specification, and it is more particularly pointed out in the appended claims.

In the drawings—

Fig. 1 is a diagrammatic view of a four pole stator winding;

Fig. 2 is a diagrammatic view showing the stator in Fig. 1 provided with supplemental windings according to the present invention;

Fig. 3 is a view similar to Fig. 2 showing a modified arrangement of the supplemental windings;

Figure 5:
Figure 6:
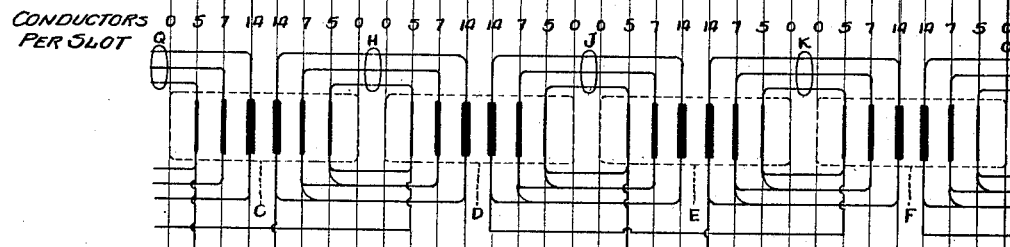
Figure 7:
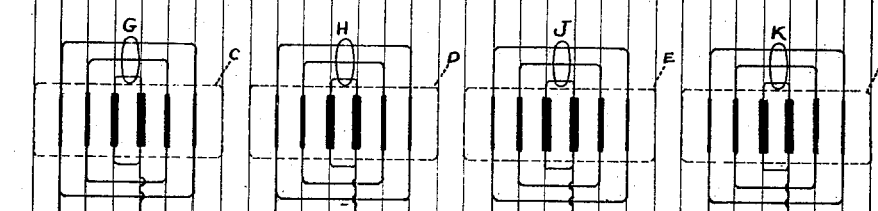
Figure 8:
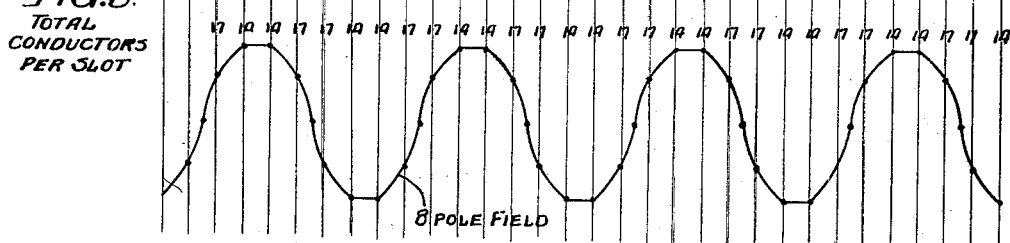
Figure 9:
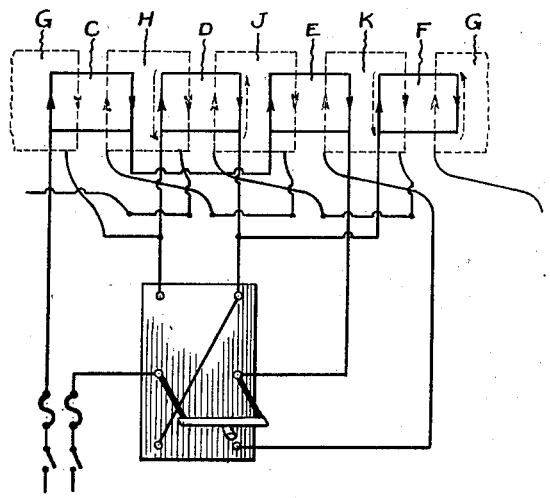
Figure 10:
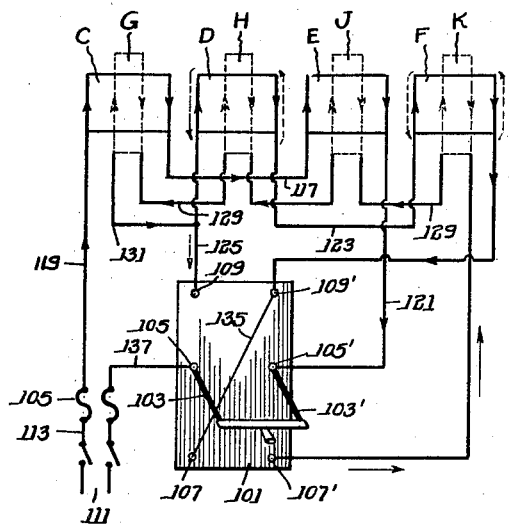

Figure 5 comprises a graphical representation of the flux intensities created by the sections C, D, E, and F when connected for four pole and eight pole operation;

Figure 6 is a diagram showing the arrangement of the sections G, H, J, K forming the auxiliary winding illustrated in Figure 2 of the drawings and Figure 7 illustrates the arrangement of the auxiliary winding indicated in Figure 3 of the drawings;

Figure 8 comprises a graphical representation of the flux intensity created by the main and auxiliary windings when connected together for eight pole operation as indicated in Figures 2 and 3 of the drawings; and Figures 9 and 10 comprise diagrams of connections including a switch for conditioning respectively the systems illustrated in Figures 2 and 3 of the drawings for four pole and eight pole operation.

It is known that with alternating current induction motors the number of revolutions may be varied by varying the number of poles. In order to make this feasible the direction of current is reversed in a part of the so-called stator winding, which part lends itself to this purpose.

Where, however, the total number of turns remains unaltered this alteration of the number of poles leads to the necessity of varying the terminal voltage, and this terminal voltage must be reduced upon an increase in the number of poles in order to prevent undue increase of the wattless current.

If, for instance, an alternator is changed from four to eight poles without varying the terminal voltage, then the wattless current must become four to six times as large as the original value so that the motor certainly will burn out.

The ratio of the terminal voltages for a four pole arrangement to that of an eight pole arrangement is approximately 1—5 : 1. In many cases the change is accomplished by connecting the sections in parallel for the smaller number of poles, and by connecting the sections in series for the larger number of poles.

It is probably not necessary to point out that with this operation there can be no question of an even approximate normal utilization of the copper present in the motor, since upon a four pole connection attained by parallel connection the effective cross-section is much greater than actually required, while upon the eight pole operation it may be just sufficient.

Since, furthermore, the winding ratio of one to two in this case is inaccurate, the torque producible with the higher number of poles is lower than that producible with the lower number of poles. Furthermore, the normal winding is usually distributed over about two-thirds of the circumference of the stator. In other words, the stator has some grooves which are not occupied by any winding.

An additional disadvantage is also that with alternating current induction motors, having a variable number of poles, a true sinusoidal arrangement of the winding is feasible with one of the number of revolutions only, but that this arrangement gives rise to so-called "wave jumps" and, furthermore, causes heating in the iron of the stator, while on the other hand the cosines are unfavorably influenced thereby.

The invention has for its object the overcoming of the above-named disadvantages and to produce an alternating current induction motor which will produce with a high number of poles, as well as with a low number of poles the same torque, while the terminal voltage remains uniform. According to this invention use is made of the space presented by the grooves of the stator, for the purpose of positioning an additional winding which upon change to the higher number of poles, is also made use of.

This winding is disposed partly in those grooves of the stator which are normally not in use, and partly in the unoccupied space of those grooves which contain a winding, parts of which are not completely filled out thereby. This additional winding comprises so large a number of turns that at a constant terminal voltage with a high number of poles, as well as with a lower number of poles approximately constant strength of current is taken from the supply system.

This winding is, furthermore, so distributed over the various grooves that with a high number of poles as well as with a lower number of poles the field retains its sinusoidal character.

So, for instance, with a four pole alternating current induction motor having four stator coils, the number of conductors per groove counting now in each coil from the inside outward increases from the middle of the coil outward or to express it differently, the strength of the field toward the margin of the pole surface is smaller than in the center.

While the motor mentioned above, by way of example, and having normally just four poles may be altered to six and eight poles by varying the direction of current in one or in two diametrically disposed coils, respectively, the sinusoidal form of the winding will be disturbed with the eight pole arrangement.

According to the invention there is disposed within those stator grooves which in most motors are not utilized, a coil which also extends into grooves located more toward the outside.

The relation of this (eight pole) winding with respect to the four pole winding is a relation such, that in each section the additional coils are added, which means that in the present case of a four pole winding, the two outermost and the two innermost grooves of each section have a smaller number of winding than the intermediate grooves.

The drawings show a number of embodiments diagrammatically.

For example, in a construction for a four section winding having conductor grooves or slots, numbered 1 to 8, the winding for ordinary four pole operation occupies the conductor slots 3—6, 2—7, and 1—8 in such a way that the slots 3 and 6 contain the fewest number of conductors, the slots 1 and 8 contain the greatest number of conductors, while the intermediate slots 2 and 7 contain an intermediate number of conductors and the slots 4 and 5 are empty. In this way, I produce coil sections for four pole operation constructed as a three coil section with unoccupied grooves in the middle part of the coil.

In order to retain with this coil the desired peculiarities of a sinusoidal shape of the field intensity during eight pole operation, I employ an additional winding, namely: winding sections G, H, J, and K comprising coils extending from groove 4 to 5, 3 to 6, and 2 to 7 with such a number of turns per coil that the number of conductors in each spool is about uniform for the innermost and for the outermost groove, while the number of wires in the grooves between them is larger.

From the description it will be understood that a motor having the grooves occupied with windings to the required number still will have as a result of the nonsinusoidal form of the field, some less desirable peculiarities so, for instance, it will hum while in operation and it will also be heated abnormally.

Fig. 1 shows the diagram of a stator A having grooves B therein numbered from 1 to 32, and coils C—D—E—F built up as three loop windings connected in series with each other. Upon connection in such manner that the current flows through the conductors of the stator in direction indicated by the dotted arrows, the stator will be a four pole stator.

Fig. 2 shows the same stator A with uniform coils G—H—J and K which serve as additional coils for eight pole connection, and when the wires or bars are connected up to permit the current to flow in the direction of the arrows there is then produced an eight pole stator.

The ratio of the number of wires in Fig. 1 is such, that in the grooves 1 and 8, 9 and 16, 17 and 24, 25 and 32 the number of wires per groove is greatest, while in the groove 3 and 6, 11 and 14, 9 and 22, 27 and 30 it is smallest. The number of wires in the intermediate grooves decreases in proportion. Owing to this arrangement the strength of the field at the margin of the pole surface is smaller than at the center of these surfaces, for producing a curve more closely resembling the sine curve.

For eight pole connection the largest number of wires or bars per groove in the groove 2 and 3, 6 and 7, 10 and 11, 14 and 15, 18 and 19, 22 and 23, 26 and 27, 30 and 31, while the smallest number of wires per groove occurs in the grooves 1 and 4, 5 and 8, 9 and 12, 13 and 16, 17 and 20, 21 and 24, 25 and 28, 29 and 32.

With both numbers of poles, therefore, there is produced a uniform decrease of the strength of the field toward the margin of the pole surfaces whereby sinusoidal shape of the fields is assured.

Fig. 3 shows the same stator A with the coils arranged therein as shown in Figs. 1 and 2 and disposed in a slightly different way. In Fig. 2 the coils are distributed in such manner that the additional winding comprising the coils G—H—J—K form a self-contained structure.

In Fig. 3 these coils are in symmetrical arrangement with respect to the coils C—D—E—F without, however, producing thereby any alteration in the operation of the motor. There may even be produced upon utilization of the winding shown in Fig. 3 some saving in copper, as compared with Fig. 2, owing to the reduction in length of the projecting ends of the coils, and the windings of Fig. 3 may, therefore, be the preferred one.

Where it is desired to use a so-called starter winding, this starter winding may be arranged to be altered in the same manner as the main phase, and it is then merely displaced relatively to the main phase.

Figure 4:
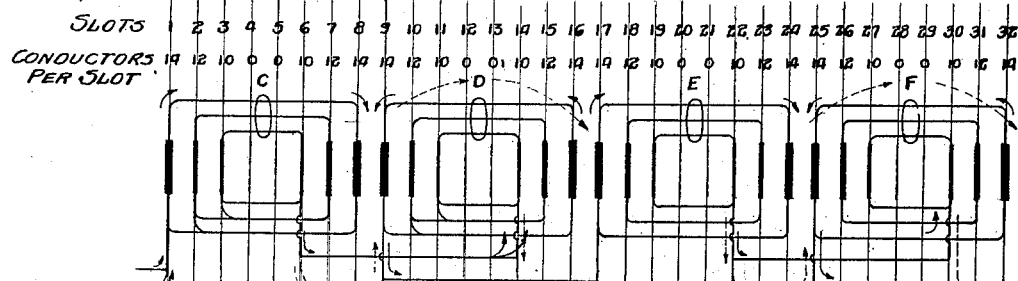
Figure 4 is a view illustrating the manner of connecting the coils forming the sections C, D, E, and F, illustrated diagrammatically in Figure 1 of the drawings.

It should be understood that Figures 1, 2 and 3 of the accompanying drawings are diagrammatic in that they show the windings in the slots of the stator as they would appear in practice in bundles of wire in loop form without showing the electrical connections between the loops or between the windings or between the windings and the source of current supply. The connections between the loops and the connections to the source of supply are made in the usual and well-known manner. For the sake of clearness in showing the distribution of the windings on the stator the connections between the windings and to the source of supply have been omitted. Fig. 1 shows by the dotted arrows the instantaneous direction of the current at a certain moment in the coils C, D, E and F when same are connected for four pole operation as indicated in solid lines in Figure 4 of the drawings. The coils are arranged in three-slot windings with the central slots 4—5, 11—13, 20—21, 28—29 empty and a relatively small number of coil conductors in the slots 3—6, 11—14, 19—22 and 27—30. The larger number of coil conductors are placed in the slots 2—7, 10—15, 18—23 and 26—31. A maximum number of coil conductors are placed in the slots 1—8, 9—16, 17—24 and 25—32. In this arrangement of the windings the desired sinusoidal form of the flux intensity in the stator A is secured. That is to say, the desired sinusoidal form of the wave is secured by having the greatest number of ampere turns effective at the centers or middle portions of the four poles represented in Fig. 1, the ampere turns decreasing substantially in proportion with a sine curve as the edges of the pole are approached substantially as shown in Figure 7 of the drawings. In order to create an eight pole field, it is merely necessary to reverse the connection of every other winding section as shown in dotted lines in Figure 4 of the drawings to obtain the instantaneous current conditions in the winding indicated in Figure 1 of the drawings by the arrows. This reversal of the connections may be accomplished by means of suitable reversing switches of known type. When the winding is thus conditioned for eight pole operation, however, the distribution of the flux intensity is such that a very unbalanced or unsymmetrical wave of flux intensity is created as indicated in Figure 7 of the drawings. I propose to rectify and overcome the unbalanced condition and restore the desired sinusoidal form of the flux intensity by providing an additional set of windings comprising the sections G, H, J and K, which windings will be energized or excited whenever the main windings C, D, E and F are conditioned for eight pole operation as aforesaid. The auxiliary windings G, H, J and K are preferably energized from the same source of power from which the main winding is excited. The main and auxiliary windings being preferably connected in series for excitation.

Figure 2 shows at G, H, J and K, the winding for the purpose of changing the motor to an eight pole motor. This is done to obtain symmetrical wave form of flux distribution during eight pole operation. To this end the coil of the section H, which occupies the slots 7 and 10 has a minimum number of conductors or turns and these conductors are associated, in the slots 7 and 10, with those conductors of the sections C and D which have an intermediate number of turns. The coil of section H, which occupies slots 6 and 11 has more turns than the coil occupying slots 7 and 10 and the conductors of this coil are associated in the slots 6, and 11, with the conductors of the coils of sections C and D that have the minimum number of conductors in said sections. The coil of the section H, which occupies slots 5 and 12, the slots not used in connection with the sections C and D, has the largest number of coil turns of the section H. It will thus be seen that when the section H is connected to the source of supply it will superpose its magnetic effect on that created by the sections C and D in such a manner as to create a maximum flux where the section C and reversed section D create the minimum flux and where the sections C and D create the maximum flux, the auxiliary winding creates a minimum flux.

The individual conductors of the windings are so distributed to correct the unbalanced field illustrated in dotted lines in Figure 5 of the drawings and produce the field of symmetrical sinusoidal intensity illustrated in Figure 8.

It can readily be seen that if the number of windings in each slot were the same in number for the coils C, D, E and F and also for the coils G, H, J and K, the field form would not be sinusoidal. When, however, the supplemental or auxiliary windings are connected to the source of alternating current supply, together with the main windings, the desired sinusoidal field form will be obtained for the larger number of poles when the flux is uniformly distributed by means of the maximum number of amperes at the middle portions of the auxiliary windings where the flux produced by the main windings is at a minimum and gradually decreasing the number of ampere turns of the auxiliary coils outwardly so as to take advantage of the slots in the stator available and at the same time secure the desired sinusoidal form of the flux wave in the stator.

Heretofore in induction motors on account of the air space between the stator and the rotor the induction in the rotor and the idling current therein increases as the number of poles is increased, and this leads to the necessity of decreasing the line voltage for the greater number of poles when the windings are not properly distributed. In my system of distribution of the windings and the superimposing of the supplemental windings, including the increasing of the number of ampere turns at the middle portions of the poles and decreasing them for the outer portions of the poles, the necessity of a variable line voltage for the source of supply to the stator windings is avoided.

In other words, by arranging both sets of windings the one set for the four poles and the other in addition for the eight poles by giving a gradual decrease of the intensity of the field from the central portions of the poles to the outer edges thereof the desired sinusoidal shape of the field is obtained with the consequence that the same voltage may be used for the source of supply of the current to the stator windings when eight poles are used as when four poles are used and, furthermore, the motor will operate with substantially the same torque for the eight poles as for the four poles.

It has been found in practice that when an alternating current induction motor is changed from a four pole motor to an eight pole motor by reversing the direction of current in a part of the stator winding, a lower applied voltage must be used. For instance, if a certain motor can run on 220 volts as a four pole motor when changed to an eight pole motor the voltage must be changed to approximately 150 volts. By introducing the additional windings G, H, J, K, however, as illustrated in Figs. 2 and 3 of the drawings, the difference between 220 volts and 150 volts or 70 volts can be taken care of so that the voltage applied need not be varied. The additional set of windings for an eight pole motor are placed in the slots in such a manner that the strength of the magnetic flux is higher in the middle of the produced poles than at the sides thereof.

If for example a certain four pole motor has a three loop winding with 10—12—14 turns in the center, intermediate and outer coils, the total number of turns would be 144. To enable this motor to run at the same voltage when switched over to eight poles, the total number of turns must be approximately double or about 248 turns. 104 turns additional are therefore required for the eight poles than for the four poles.

Considering one-quarter of the stator or eight slots numbered 5 to 12, inclusive, the following formula may be used:

| Slots | 5— 6— 7— 8— 9—10—11—12 |
|---|---|
| 4 pole | 0—10—12—14—14—12—10— 0 |
| 8 pole | 14—17—17—14—14—17—17—14 |
| Additional winding required for 8-pole operation | 14— 7— 5— 0— 0— 5— 7—14 |

In other words, for the four pole arrangement the windings in slots 5, 6, 7, 8, 9, 10, 11 and 12 would be respectively 0—10—12—14—14—12—10—0, whereas for the eight pole arrangement the windings would be respectively 14—17—17—14—14—17—17—14 and therefore the additional windings secured by the additional coils would be respectively 14—7—5—0—0—5—7—14.

The same principle is embodied in Fig. 3. In both Fig. 3 and in Fig. 4 the sinusoidal shape of the field form is obtained with the maximum field strength in the center of each pole both in the four pole arrangement and in the eight pole arrangement. In Fig. 3 many crossings of the windings are avoided and therefore the amount of copper is reduced to a minimum. Both in Fig. 2 and in Fig. 3 when the additional windings G, H, J, K, are switched in they are connected in series with the windings C, D, E and F.

In Figures 9 and 10, I have shown a switching scheme for controlling the power delivered to the windings so that the same can be conditioned for four pole or eight pole operation merely by throwing a suitable switch. Figure 9 shows the necessary connections when the arrangement of winding sections, illustrated in Figure 2, is employed in the motor, while Figure 10 indicates the connections when the arrangement shown in Figure 3 is employed. In both instances, the control switch comprises a double pole, a double throw switch 101 having preferably a pair of knife blades 103 and 103' pivotally connected on terminal supports 105 and 105'.

The switch also comprises a pair of terminals 107 and 107′ engageable respectively by the knife blades 103 and 103′ when the switch is in one of its operative shiftable positions and a second pair of terminals 109 and 109′ engageable respectively by the blades 103 and 103′ when the switch is in another of its operative shiftable positions. Connections are preferably made from the winding excitation source 111 through a suitable disconnecting switch 113 and suitable circuit protecting devices 115 such as the overload fuses illustrated. Two of the main winding sections (C and E) are preferably connected in series by the conductor 117 and the free end of the section C is connected by means of a conductor 119 to one side of the source of winding excitation power while the free end of the section E is connected by means of a conductor 121 to the terminal 105′ to which one blade of the switch is pivotally mounted. The remaining sections D and F of the main winding are connected in series by a conductor 123 and the free end of the section D is connected to the terminal 109 of the switch by means of a conductor 125 while the free end of the section F is connected by means of a conductor 127 to the terminal 109′. The several sections G, H, J and K of the auxiliary winding are connected in series by means of conductors 129 and the free end of the section G is connected by means of a conductor 131 to the terminal 109 or the conductor 125 leading from said terminal to the free end of the section D. The free end of the other end of section K of the auxiliary winding is connected by means of a conductor 133 to a terminal 109′ of the switch and the terminal 107 is directly connected by means of the conductor 135 to the diagonally offset terminal 109′.

In operation when the switch is in the down position, viewing the drawings, a series circuit will be set up from the source of winding excitation through the conductor 119, the winding section C, the conductor 117, the winding section E, the conductor 121, the switching blade 103′, the terminal 107′ and the conductor 133 through the auxiliary winding sections K, J, H and G, thence through the conductors 131 and 125 through the winding sections D and F thence through the conductor 127, terminal 109′, conductor 135, terminal 107, switching blade 103, and support terminal 105 and thence back to the source of exciting power through the conductor 137. This is the circuit indicated by solid arrows in Figures 9 and 10.

If the switch is placed in the "up" position, viewing Figures 11 and 12, the auxiliary windings G, H, J, and K will be cut out of the circuit by the breaking of the connection between the blade 103′ and the terminal 107′ and the sections D and F of the main winding will be reversely connected with respect to the remaining sections so that the flow of exciting current through these sections will be reversed, as indicated by the dotted arrows and the sections C, D, E, and F, will be connected for four pole operation.

It is thought that the invention and numerous of its attendant advantages will be fully understood from the foregoing description and it is obvious that numerous changes may be made in the form, construction and arrangement of the several parts without departing from the spirit or scope of my invention or sacrificing any of its attendant advantages; the form herein described being a preferred embodiment for the purpose of illustrating my invention.

I claim:—

1. An alternating current induction motor comprising a stator, a set of coils for said stator arranged to produce a predetermined number of poles, the coils for each pole comprising a plurality of loops arranged to span different numbers of slots in said stator, the number of turns for the loops of any pole being arranged to decrease outwardly from the axis of the pole, and a supplemental set of coils having a plurality of loops for each pole, the loops of said second set being displaced relative to the loops of said first set.

2. An alternating current motor comprising a stator having main windings distributed for a predetermined number of poles with maximum flux at the central portions of the poles and gradually decreasing toward the outer portions thereof, auxiliary windings associated with said main windings to produce a predetermined larger number of poles with maximum flux at the central portions of the poles and gradually decreasing toward the outer portions thereof and thereby maintain substantially uniform sinusoidal wave form as to such flux, the conductors of said main and auxiliary windings being so distributed that all of the main windings are energized at all times, none being rendered inactive to effect a change in polarity thus permitting substantially the same line potential to be used for the higher number of poles as for the lower number of poles.

3. An alternating current induction motor comprising a main winding for creating a field having a pre-determined number of poles, said winding being distributed to provide a number of conductors per slot increasing from the axis of each pole outwardly to produce similar, uniformly increasing and decreasing field strengths for the several poles, means to change the number of poles in said field, an auxiliary winding distributed to complement the magnetic effect created by the main winding in order to provide similar uniformly varying magnetic intensities throughout the several poles of the field and means to excite said auxiliary winding when the field polarity is changed.

4. An alternating current motor having a frame portion provided with conductor slots, a main winding comprising a plurality of coils arranged in some of said slots to produce a field having a pre-determined number of poles, said coils providing a number of conductors per slot increasing from the axis of each pole outwardly and a supplemental winding comprising coils arranged in a definite physical relationship with the coils of the main winding and wherein the variation in the number of conductors per slot for the auxiliary winding bears a definite relationship to the distribution of the conductors of the main winding.

5. An alternating current motor as set forth in claim 4 wherein the distribution of the conductors of the auxiliary winding in the several slots has a complementary relationship to the distribution of the conductors of the main windings in said slots.

6. An alternating current motor as set forth in claim 4 wherein the number of conductors per slot in the auxiliary windings vary inversely as the variation in the conductors per slot in the main winding.

7. An alternating current motor having a frame portion provided with conductor slots, a main winding comprising a plurality of coils arranged in some of said slots to produce a field having a pre-determined number of poles, said coils providing a number of conductors per slot increasing from the axis of each pole outwardly and a supplemental winding comprising coils arranged in a definite physical relationship with the coils of the main winding, said frame having an even number of slots, at least 6, per pole, at least two of said slots being free of the main winding, at least two other of said slots being free of the auxiliary winding and at least two other of said slots containing portions of both windings.

8. An alternating current motor having a frame portion provided with conductor slots, a main winding comprising a plurality of coils arranged in some of said slots to produce a field having a pre-determined number of poles, said coils providing a number of conductors per slot increasing from the axis of each pole outwardly and a supplemental winding comprising coils arranged in definite physical relationship with the coils of the main winding, said main and auxiliary windings being distributed so that a portion of each winding occupies some of the slots in common.

9. An alternating current motor as set forth in claim 8, wherein some of the slots are occupied solely by portions of only one winding.

10. An alternating current motor as set forth in claim 8 wherein the main and auxiliary winding are distributed so that certain of the slots are occupied in common by conductors forming portions of each winding, certain of said slots so occupied containing more conductors of one winding and less conductors of the other.

In testimony whereof I have signed my name to this specification on this 24th day of June, A. D. 1927.

WILLIAM RIENKS.